(12) United States Patent
Kawada et al.

(10) Patent No.: US 6,268,708 B1
(45) Date of Patent: Jul. 31, 2001

(54) CONTROL APPARATUS FOR ELECTRIC POWER STEERING SYSTEM

(75) Inventors: Hideaki Kawada; Shuji Endo, both of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/460,728

(22) Filed: Dec. 14, 1999

(51) Int. Cl.$^7$ ........................................ H02P 1/04
(52) U.S. Cl. .................. 318/430; 318/138; 318/254; 318/258; 318/269; 318/273; 318/430; 318/432; 318/434
(58) Field of Search ..................... 318/430, 432, 318/434, 466, 467, 438, 258, 269, 273; 361/31; 180/79.1

(56) References Cited

U.S. PATENT DOCUMENTS

| | | | |
|---|---|---|---|
| 4,775,939 | * 10/1988 | Nakashima | 361/31 |
| 4,986,379 | * 1/1991 | Morishita | 180/79 |
| 5,648,887 | * 7/1997 | Herndon et al. | 361/31 |
| 5,839,537 | * 11/1998 | Nishino et al. | 180/443 |

FOREIGN PATENT DOCUMENTS 2-162159    6/1990 (JP) .................... B62D/5/04

10-191551   7/1998 (JP) .................... H02H/3/093

* cited by examiner

*Primary Examiner*—Paul Ip
*Assistant Examiner*—Tyrone Smith
(74) *Attorney, Agent, or Firm*—Sughrue, Mion, Zinn, Macpeak & Seas, PLLC

(57) ABSTRACT

In control devices of electric power steering systems, steering characteristics are improved by control being carried out by means of a signal based on rotor speed or steering angle after failure of a torque sensor is detected. In the present invention, in a control device of an electric power steering system for controlling a motor applying a steering assist force to a steering mechanism on the basis of a current control value computed from a motor current value and a steering assist command value computed on the basis of a steering torque in a steering shaft, two over-current detecting circuits have different detection current values; when an over-current is detected by the circuit having the lower current detection value within the response time of current control, the duty of PWM for driving the motor is restricted, and when an over-current is detected by the circuit having the higher current detection value, motor current output is stopped and a relay is opened and the system is disengaged from the steering mechanism.

5 Claims, 8 Drawing Sheets

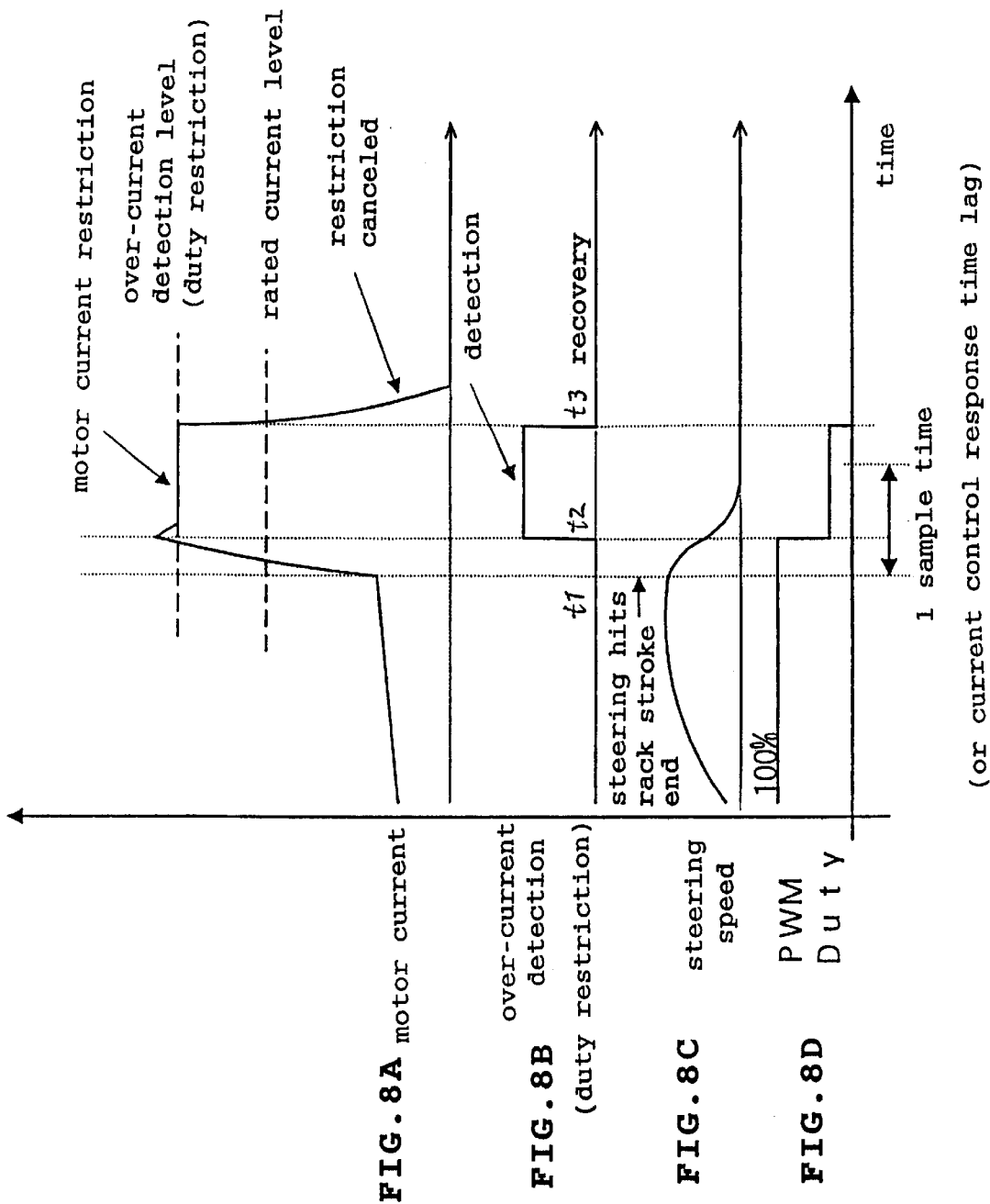

CONTROL APPARATUS FOR ELECTRIC POWER STEERING SYSTEM

BACKGROUND OF THE INVENTION

1. Field of the Invention

This invention relates to a control device of an electric power steering system which applies a steering assist force from a motor to the steering gear of an automotive vehicle, and particularly to a control device of an electric power steering system wherein an efficient and economical motor protection measure is realized by a protection function being divided into two stages in correspondence with over-current values.

2. Description of the Related Art

An electric power steering system using a rotational force from a motor to apply an assisting force to the steering gear of an automotive vehicle applies a driving force from the motor to a steering shaft or a rack shaft via a speed-reducer by means of a transmission mechanism such as a gear or a belt. In this kind of electric power steering system in related art, to generate an assist torque (steering assist torque) correctly, feedback control of the motor current is carried out. Feedback control adjusts the voltage impressed on the motor so that a detected motor current value approaches a current control value, and the adjustment of the voltage impressed on the motor is generally carried out by adjustment of a PWM (Pulse Width Modulation) control duty ratio.

The general makeup of an electric power steering system is shown in FIG. 1. A shaft 2 of a steering wheel 1 is connected via universal joints 4a, 4b and a rack and pinion mechanism 5 to tie rods 6 of steerable wheels. A torque sensor 10 for detecting a steering torque from the steering wheel 1 is provided on the shaft 2, and a motor 20 for augmenting the steering force of the steering wheel 1 is connected to the shaft 2 by way of a clutch 21 and speed-reducing gears 3. Power is supplied from a battery 14 through an ignition switch 11 and a relay 13 to a control unit 30 for controlling the power steering system. The control unit 30 calculates a steering assist command value I of an assist command on the basis of the steering torque T detected by the torque sensor 10 and a vehicle speed V detected by a vehicle speed sensor 12, and controls a current supplied to the motor 20 on the basis of the computed steering assist command value I. The clutch 21 is ON/OFF-controlled by the control unit 30, and in a normal operating state is ON (engaged). When it is determined by the control unit 30 that the power steering system has failed, and when the power supply (at voltage Vb) from the battery 14 is switched OFF by the ignition switch 11 or the relay 13, the clutch 21 is switched OFF (disengaged). The relay 13 is switched OFF at times of emergency.

The control unit 30 consists mainly of a CPU, and general functions executed by a program inside this CPU are shown in FIG. 2. In FIG. 2, for example the phase compensator 31 does not denote a phase compensator consisting of independent hardware, but rather denotes a phase compensation function executed by the CPU. The functions and operation of the control unit 30 will now be described. The steering torque T detected and inputted by the torque sensor 10 is phase-compensated by the phase compensator 31 to raise the stability of the steering gear, and a steering torque TA is inputted to a steering assist command value calculator 32. The vehicle speed V detected by the vehicle speed sensor 12 is also inputted to the steering assist command value calculator 32. The steering assist command value calculator 32 determines a steering assist command value I, which is a control target value of the current supplied to the motor 20, on the basis of the inputted steering torque TA and vehicle speed V, and the steering assist command value calculator 32 is provided with a memory 33. The memory 33 holds steering assist command values I corresponding to steering torques with the vehicle speed V as a parameter, and is used in the computation of the steering assist command value I carried out by the steering assist command value calculator 32. The steering assist command value I is inputted to a subtractor 30A and to a differential compensator 34 of a feed-forward line for raising response speed; a difference (I−i) from the subtractor 30A is inputted to a proportional computing element 35, and a proportional output thereof is inputted to an adder 30B and is also inputted to an Integral compensator 36 for improving the characteristics of a feedback line. The outputs of the differential compensator 34 and the integral compensator 36 are also additively inputted to the adder 30B, and a current control value E, which is the addition result of the adder 30B, is inputted to a motor driving circuit 37 as a motor driving signal. A motor current value i of the motor 20 is detected by a motor current detecting circuit 38, and the motor current value i is fed back by being inputted to the subtractor 30A.

An example of the construction of the motor driving circuit 37 is shown in FIG. 3. This motor driving circuit 37 has a FET gate driving circuit 371 for driving the gates of field effect transistors (FETs) FET1 through FET4 by way of a gate circuit 373 on the basis of the current control value E from the adder 30B, an H-bridge circuit made up of the FETs FET1 through FET4, and a boosted power supply 372 for driving the high sides of the FETs FET1 and FET2. The FET gate driving circuit 371 and the boosted power supply 372 constitute a motor control circuit 37A and the H-bridge circuit, the gate circuit 373 and current detection resistors R1, R2 constitute a motor driving circuit proper 37B. PWM signals from the FET gate driving circuit 371 are normally supplied directly through the gate circuit 373 to the FETs FET1 through FET4, but when a cutoff signal CS is inputted all the PWM signals are cut off. The FETs FET1 and FET2 are switched ON and OFF by a PWM (Pulse Width Modulated) signal with a duty ratio D1 determined on the basis of the current control value E, and the size of a current Ir actually flowing through the motor 20 is thereby controlled. The FETs FET3 and FET4 are driven by a PWM signal with a duty ratio D2 defined by a predetermined linear function (D2=a·D1 + b, where "a" and "b" are constants) when the duty ratio D1 is small, and after the duty ratio D2 also reaches 100% are switched ON and OFF in correspondence with the rotation direction of the motor 20 determined by the sign of the PWM signal.

In this kind of electric power steering system, when while the motor is being driven there is a failure such as shorting or grounding of the motor 20 or the motor driving circuit proper 37B, an over-current arises in the motor 20 or the motor driving circuit proper 37B, and if left alone would result in an accident such as a fire. Because of this, an over-current detecting circuit 39 has been provided as shown in FIG. 4; any over-current has been detected by means of software or hard logic, and the motor current output has been stopped by the cutoff signal CS being inputted to the gate circuit 373 in the motor driving circuit proper 37B.

However, when, in steering around an acute turn or the like, the wheel lock end is strongly hit as shown in FIG. 5, an over-current arises in the motor 20 and the motor driving circuit proper 37B due to the sudden change in steering. That is, when the steering is being turned at high speed, the duty ratio of PWM is at nearly 100% to compensate for counter-electromotive force of the motor 20. However, as a result of the rack hitting the rack end in that instant the rotation of the steering suddenly decreases, and the rotation speed becomes substantially zero. In the CPU sampling time, the duty ratio of PWM is still almost 100% of what it was before. Consequently, a current close to the lock current flows through the motor 20, and also when current control is realized by means of an analog circuit, due to lag of the response time of the current control, similarly a current close to the lock current flows through the motor.

In the over-current detecting circuit 39 of related art shown in FIG.4, an over-current detection level like that shown in FIG. 6A has been set, and at the time t2 when the motor current value i reaches this over-current detection level the over-current detecting circuit 39 has outputted the cutoff signal CS (FIG.6B) and thereby cut off the motor output and stopped the system. FIG.6C shows steering angle, and FIG.6D shows how after the rack stroke end is hit at time t1 the duty ratio is changed on the basis of the over-current detection at the time t2 when the over-current is detected. The power steering system stopping like this when, even though there has not been a failure of the power steering system, an over-current has arisen as a result of a steering execution, is undesirable to the driver. However, if this over-current detection were to be dispensed with a large current would arise in the motor 20 and the motor driving circuit proper 37B at the time of an actual failure, and in a worst case there is a possibility of this leading to a fire in the vehicle.

SUMMARY OF THE INVENTION

It is therefore an object of the present invention to provide a control device of an electric power steering system wherein a protection function is divided in correspondence with over-current sizes so that when a motor over-current arises in the electric power steering system the motor output is not stopped if the over-current is not due to a failure of the electric power steering system.

The invention relates to a control device of an electric power steering system for controlling a motor applying a steering assist force to a steering mechanism on the basis of a current control value computed from a motor current value and a steering assist command value computed on the basis of a steering torque in a steering shaft, and in the invention the above-mentioned object is achieved by a first over-current detecting circuit with a low detection current value and a second over-current detecting circuit with a high detection current value being provided and a duty ratio of PWM for driving the motor being restricted within the response time of current control when an over-current is detected by the first over-current detecting circuit and an output current to the motor being stopped and a relay being opened when an over-current is detected by the second over-current detecting circuit.

BRIEF DESCRIPTION OF THE DRAWINGS

In the accompanying drawings:

FIG. 8 is a flow chart showing an example of the operation of the present invention.

DETAILED DESCRIPTION OF THE PREFERRED EMBODIMENTS

In this invention, a motor current detected by a current detecting circuit is divided into a signal for current restriction and a signal for over-current detection. Also, the current signal for over-current detection is classified into two and one detects an excessive over-current of a kind arising during steering at times such as when a steering wheel lock end is reached and the other detects an over-current resulting from a failure such as grounding or shorting arising in the motor or the motor driving circuit.

An over-current detection value for times such as when a steering wheel lock end is reached is made a value lower than an over-current value arising when there is a failure of the motor or the motor driving circuit but higher than the maximum current output demanded by the system. When this over-current is detected, the duty ratio of PWM driving the motor is set to a current value such that there will be no FET damage. And when determining the duty ratio of PWM, the battery voltage may be read in and a duty ratio value corresponding to the battery voltage then set. By this means, it is possible to restrict the motor current so that an excessive current does not flow even when the battery voltage is high. Also, because when the temperature of the motor is low the motor resistance is low, the motor current is different for the same duty ratio. Accordingly, by correcting the value of the duty ratio of PWM also in correspondence with the motor temperature, it is possible to restrict the motor current so that an excessive current does not flow even when the motor temperature is low. The over-current detection value for failure of the motor or the motor driving circuit is set to a value such that there will be no FET or relay damage due to an over-current of that value. Because when this over-current is detected it is clearly due to failure of the motor driving circuit, immediately the motor current output is stopped and the relay is cut off. These two types of over-current detection may be realized by hard logic or may be realized by software.

A preferred embodiment of the invention will now be described with reference to drawings.

Figure 1:
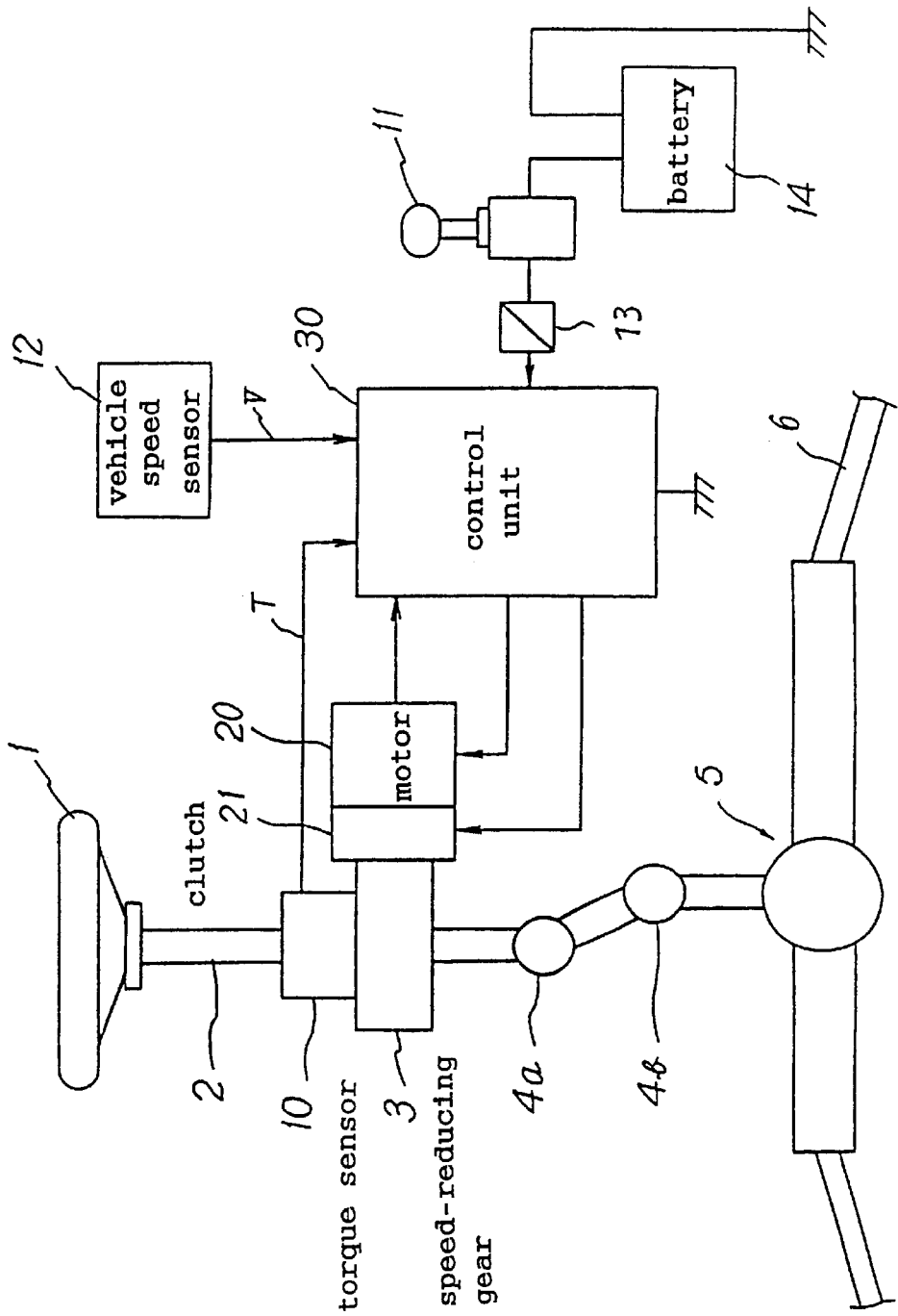
FIG. 1 is a block diagram showing an example of an electric power steering system (related art)
Figure 2:
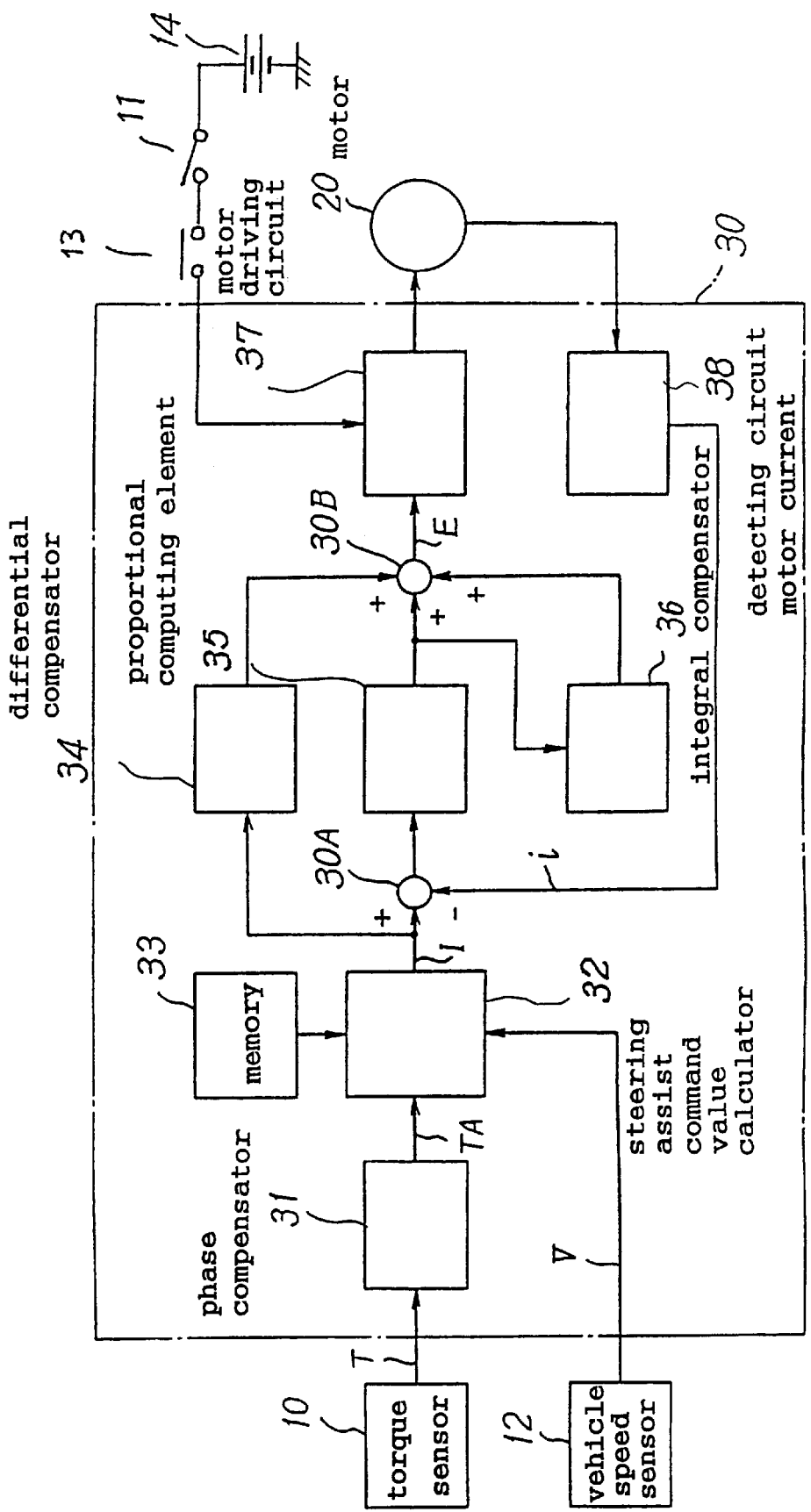
FIG. 2 is a block diagram showing a general internal construction of a control unit (related art)
Figure 3:
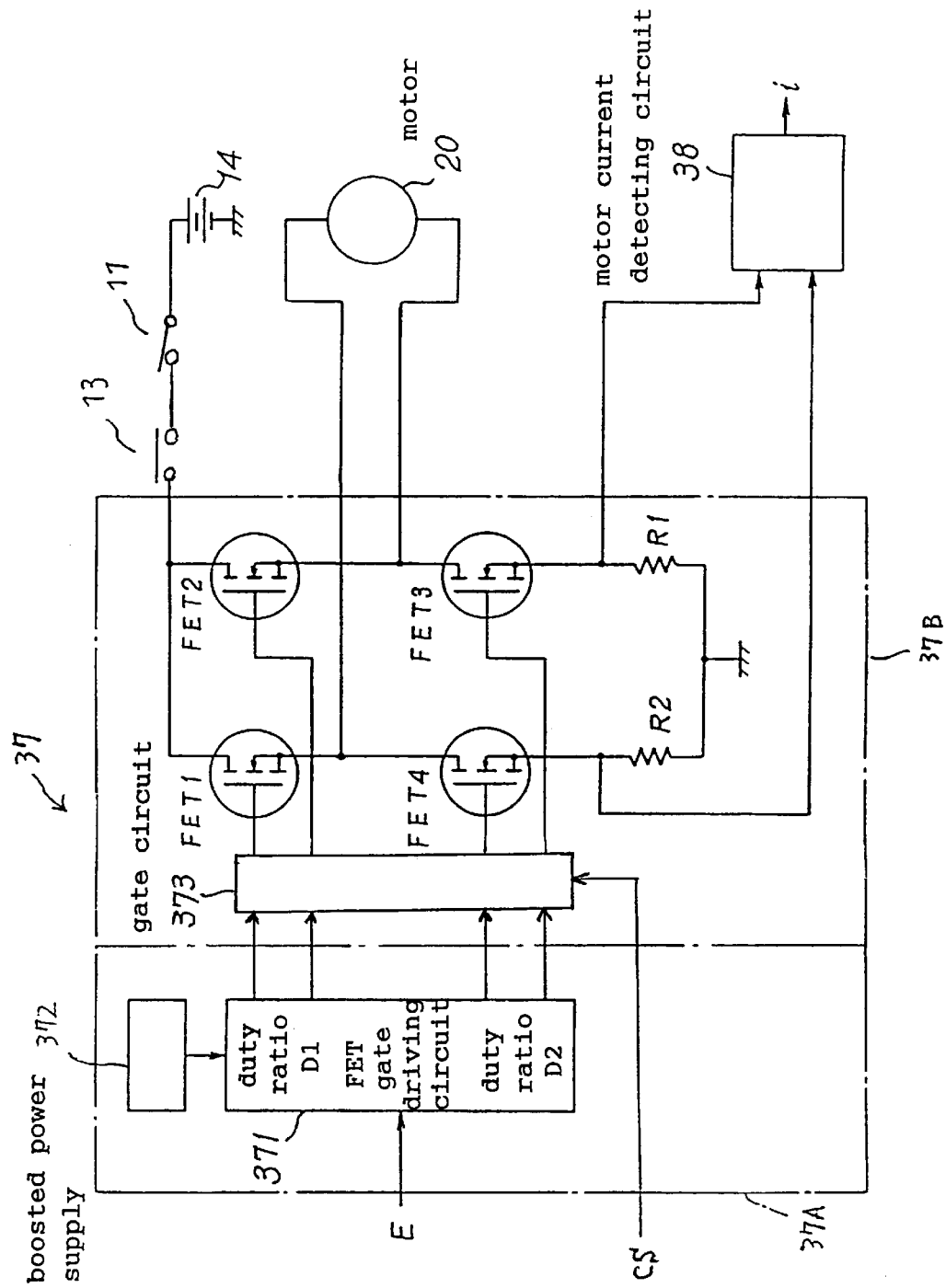
FIG. 3 is a schematic view showing an example of a motor driving circuit (related art)
Figure 4:
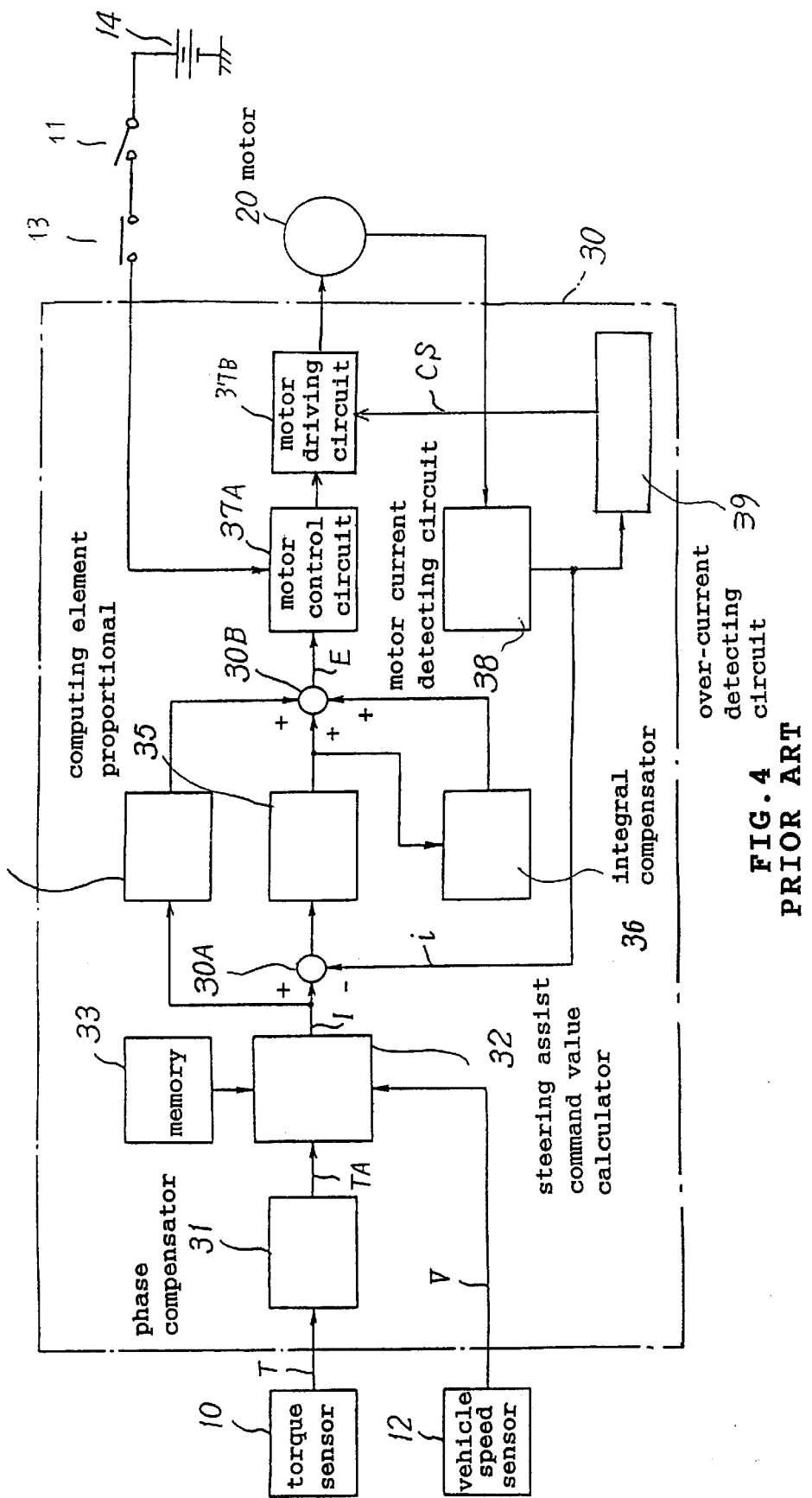
FIG. 4 is a block diagram showing an example of a control device (related art)
Figure 5:
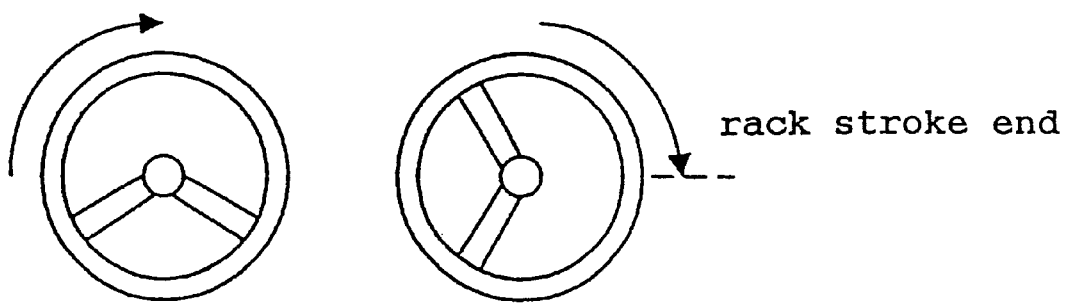
FIG. 5 is a view illustrating a rack stroke end.
Figures 6A, 6B, 6C, 6D:
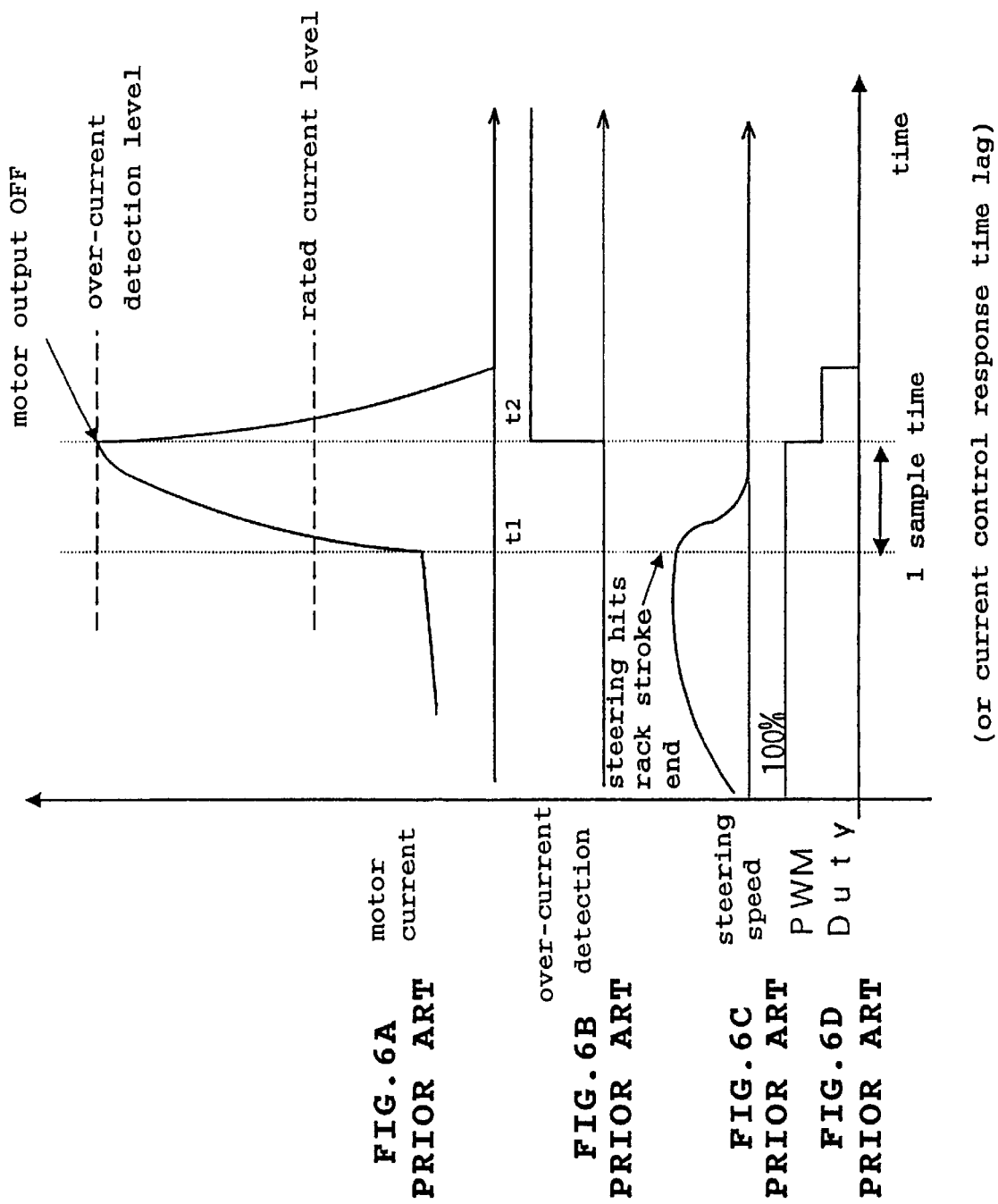
FIGS. 6A through 6D are time charts showing an example of the operation of a related art device.
Figure 7:
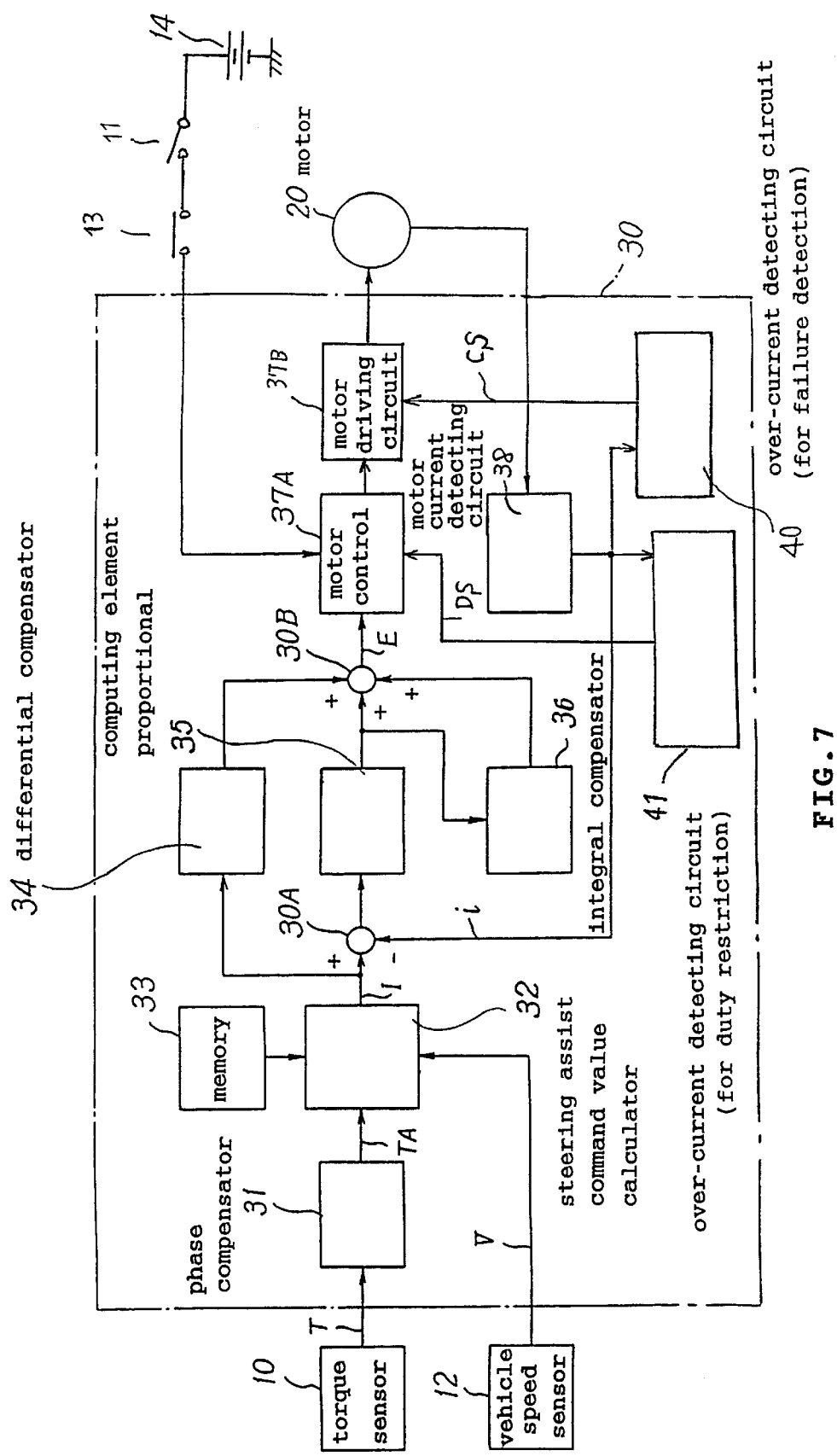
FIG. 7 is a block diagram showing the construction of a preferred embodiment of the present invention.

A preferred embodiment of the invention is shown in FIG. 7, in a form equivalent to that of FIG. 4. In this preferred embodiment an over-current detecting circuit 40 for failure detection and an over-current detecting circuit 41 for duty restriction are provided, and the detection current value (over-current detection level) of the over-current detecting circuit 41 for duty restriction is set larger than a rated current level but smaller than the detection current value of the over-current detecting circuit 40. When an over-current is detected by the over-current detecting circuit 41, a control signal DS applying a duty restriction is outputted to the FET gate driving circuit 371 in the motor control circuit 37A. And when an over-current is detected by the over-current detecting circuit 40, a cutoff signal CS cutting off the motor drive is outputted to the gate circuit 373 in the motor driving circuit proper 37B and the relay 13 is switched OFF and the motor output is thereby stopped.

FIG. 8 shows an example of the operation of this preferred embodiment. When (at time t2) the motor current i exceeds the over-current detection level for duty restriction as a result of hitting a rack stroke end at time t1 as shown in FIG. 8A, a restriction signal DS is outputted as shown in FIG. 8B from the over-current detecting circuit 41, and as a result of this restriction signal DS being inputted into the FET gate driving circuit 371, even if it is within a sampling time, the duty of PWM is restricted, as shown in FIG. 8D. When an over-current is detected at the detection current value of the over-current detecting circuit 40, a cutoff signal CS is inputted to the gate circuit 373 in the motor driving circuit proper 37B and motor driving is stopped, and the relay 13 is also switched OFF.

When current control is realized with an analog circuit, similarly, when the over-current detection level for duty restriction is exceeded, the voltage of a signal generating the duty is clamped and the duty of PWM is restricted.

In this invention, because a motor over-current is detected using a low level for duty restriction and a high level for failure detection, and over-current countermeasures corresponding to different motor currents are provided, efficient and economical control is possible and comfortable steering is realized. And the motor output is not stopped just because the steering has reached a rack stroke end, when the electric power steering system has not failed.

What is claimed is:

1. An electric power steering system for controlling a motor applying a steering assist force to a steering mechanism on the basis of a current control value computed from a motor current value and a steering assist command value computed on the basis of a steering torque in a steering shaft, wherein there are provided a first over-current detecting circuit with a low detection current value and a second over-current detecting circuit with a high detection current value and a duty ratio of PWM for driving the motor is restricted within the response time of current control when an over-current is detected by the first over-current detecting circuit and an output current to the motor is stopped and a relay is opened when an over-current is detected by the second over-current detecting circuit.

2. An electric power steering system according to claim 1, wherein the duty of PWM is restricted to a duty corresponding to the temperature of the motor or to a battery voltage when an over-current is detected by the first over-current detecting circuit and the duty of PWM for driving the motor is restricted.

3. An electric power steering system according to claim 1, wherein the detection current value of the first over-current detecting circuit is set larger than a rated current level and smaller than the detection current value of the second over-current detecting circuit.

4. An electric power steering system according to claim 1, wherein the relay is connected via an ignition switch between a battery and a motor control circuit of the motor.

5. An electric power steering system according to claim 1, wherein the duty of PWM is restricted by the voltage of a signal generating the duty being clamped when the current control system of the motor is an analog circuit.

* * * * *